(12) United States Patent
Takano et al.

(10) Patent No.: US 12,152,096 B2
(45) Date of Patent: Nov. 26, 2024

(54) METHOD FOR MANUFACTURING COPOLYMER

(71) Applicant: BRIDGESTONE CORPORATION, Tokyo (JP)

(72) Inventors: Shigenaga Takano, Tokyo (JP); Olivier Tardif, Tokyo (JP); Shojiro Kaita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 513 days.

(21) Appl. No.: 17/614,672

(22) PCT Filed: Jun. 5, 2020

(86) PCT No.: PCT/JP2020/022421
§ 371 (c)(1),
(2) Date: Nov. 29, 2021

(87) PCT Pub. No.: WO2020/255761
PCT Pub. Date: Dec. 24, 2020

(65) Prior Publication Data
US 2022/0220238 A1    Jul. 14, 2022

(30) Foreign Application Priority Data
Jun. 21, 2019  (JP) .................................. 2019-115807

(51) Int. Cl.
*C08F 4/52* (2006.01)
*C08F 4/54* (2006.01)
*C08F 210/16* (2006.01)
*C08F 210/18* (2006.01)
*C08F 236/08* (2006.01)

(52) U.S. Cl.
CPC .............. *C08F 210/18* (2013.01); *C08F 4/52* (2013.01); *C08F 4/545* (2013.01); *C08F 236/08* (2013.01); *C08F 2420/00* (2013.01); *C08F 2800/20* (2013.01)

(58) Field of Classification Search
None
See application file for complete search history.

(56) References Cited

U.S. PATENT DOCUMENTS

2018/0298135 A1* 10/2018 Kimura ................. C08F 210/02

FOREIGN PATENT DOCUMENTS

| EP | 3 363 824 A1 | 8/2018 | |
|---|---|---|---|
| EP | 3 363 832 A1 | 8/2018 | |
| EP | 3 722 338 A1 | 10/2020 | |
| EP | 3 858 878 A1 | 8/2021 | |
| EP | 3922672 A1 * | 12/2021 | ............. B33Y 70/00 |
| JP | 2012-131965 A | 7/2012 | |
| JP | 2013-155359 A | 8/2013 | |
| JP | 2016-210940 A | 12/2016 | |
| WO | WO-2017065301 A1 * | 4/2017 | ............... B60C 1/00 |
| WO | WO-2020121745 A1 * | 6/2020 | |

OTHER PUBLICATIONS

International Search Report of PCT/JP2020/022421 dated Aug. 25, 2020 [PCT/ISA/210].
Extended European Search Report issued Jul. 5, 2023 in Application No. 20827407.6.
Search Report dated Nov. 3, 2022 issued in Chinese Application No. 202080040252.0.
International Preliminary Report on Patentability with Translation of the Written Opinion dated Dec. 21, 2021 in International Application No. PCT/JP2020/022421.

* cited by examiner

*Primary Examiner* — Richard A. Huhn
(74) *Attorney, Agent, or Firm* — Sughrue Mion, PLLC

(57) ABSTRACT

An object of the present disclosure is to provide a method for manufacturing a copolymer, wherein a crystal content and a vinyl bond content (or a glass transition temperature) of the copolymer can be controlled. Specifically, the present disclosure provides a method for manufacturing a copolymer, wherein the method comprises a process of copolymerizing ethylene with isoprene under the presence of a polymerization catalyst composition containing a half metallocene cation complex represented by following general formula (I)

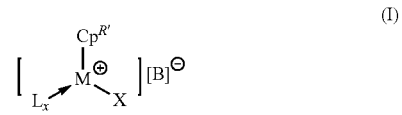

(In formula (I), M represents a lanthanoid element, scandium or yttrium; $Cp^{R'}$ represents substituted cyclopentadienyl, substituted indenyl or substituted fluorenyl; X represents hydrogen atom, halogen atom, alkoxy, thiolate, amide, silyl, or a $C_{1-20}$ monovalent hydrocarbon group; L represents a neutral Lewis base; w represents an integer in the range of 0 to 3; and [B]⁻ represents a non-coordinating anion), wherein $Cp^{R'}$ in general formula (I) has at least two substituent groups.

9 Claims, No Drawings

METHOD FOR MANUFACTURING COPOLYMER

CROSS REFERENCE TO RELATED APPLICATIONS

This application is a National Stage of International Application No. PCT/JP2020/022421, filed Jun. 5, 2020, claiming priority to Japanese Patent Application No. 2019-115807, filed Jun. 21, 2019.

TECHNICAL FIELD

The present invention relates to a method for manufacturing a copolymer.

BACKGROUND ART

There has been conventionally known a method for manufacturing a non-conjugated olefin-conjugated diene copolymer by copolymerization of a non-conjugated olefin and a conjugated diene. For example, PTL 1 discloses a technique of manufacturing an ethylene-butadiene copolymer by copolymerization of ethylene and butadiene under the presence of a complex having scandium as the core metal.

CITATION LIST

Patent Literature

PTL 1: JP 2012-131965 A

SUMMARY OF THE INVENTION

However, it has been revealed as a result of a keen study of the inventors of the present disclosure that it is difficult to control a crystal content and a vinyl bond content (or a glass transition temperature) of a resulting copolymer in a satisfactory manner by the conventional technique as described above.

In view of this, the present disclosure aims at solving the prior art problem described above and an object thereof is to provide a method for manufacturing a copolymer, wherein a crystal content and a vinyl bond content (or a glass transition temperature) of the copolymer can be satisfactorily controlled.

The primary features of the present disclosure for achieving the aforementioned object are as follows.

A method for manufacturing a copolymer of the present disclosure includes a process of copolymerizing ethylene with isoprene under the presence of a polymerization catalyst composition containing a half metallocene cation complex represented by following general formula (I)

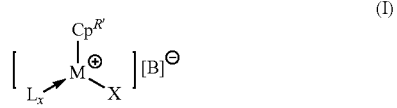

(I)

(In formula (I), M represents a lanthanoid element, scandium or yttrium; $Cp^{R'}$ represents substituted cyclopentadienyl, substituted indenyl or substituted fluorenyl; X represents hydrogen atom, halogen atom, alkoxy, thiolate, amide, silyl, or a $C_{1-20}$ monovalent hydrocarbon group; L represents a neutral Lewis base; w represents an integer in the range of 0 to 3; and $[B]^-$ represents a non-coordinating anion), wherein $Cp^{R'}$ in general formula (I) has at least two substituent groups. According to the method for manufacturing a copolymer of the present disclosure, it is possible to control a crystal content (crystallinity) and a vinyl bond content (or a glass transition temperature) of the copolymer thus manufactured, whereby a copolymer having a crystal content (crystallinity) and a vinyl bond content (or a glass transition temperature) as desired can be obtained.

In a preferable example of the method for manufacturing a copolymer of the present disclosure, $Cp^{R'}$ in general formula (I) is a substituted indenyl. A crystal content and a vinyl bond content (or a glass transition temperature) of the copolymer thus manufactured can be more easily controlled than otherwise in this case.

It is preferable that at least one substituent group of the substituted indenyl contains Si in this regard. A vinyl bond content of the copolymer thus manufactured can be more easily increased and the glass transition temperature of the copolymer can be more easily raised than otherwise in this case.

Further, it is preferable that at least one substituent group of the substituted indenyl exists on the five-membered ring of the substituted indenyl. A vinyl bond content of the copolymer thus manufactured can be more easily increased and the glass transition temperature of the copolymer can be more easily raised than otherwise in this case.

In another preferable example of the method for manufacturing a copolymer of the present disclosure, the polymerization catalyst composition contains no halogen compound. It is possible to obtain a copolymer having a higher vinyl bond content than otherwise in this case.

According to the present disclosure, it is possible to provide a method for manufacturing a copolymer, which method can satisfactorily control a crystal content and a vinyl bond content (or a glass transition temperature) of the resulting copolymer.

DETAILED DESCRIPTION

Hereinafter, a method for manufacturing a copolymer of the present disclosure will be demonstratively described in detail based on embodiments thereof.

<Method for Manufacturing Copolymer>

A method for manufacturing a copolymer of the present disclosure includes a process of copolymerizing ethylene with isoprene under the presence of a polymerization catalyst composition containing a half metallocene cation complex represented by general formula (I) described above, wherein $Cp^{R'}$ in general formula (I) has at least two substituent groups.

The half metallocene cation complex represented by general formula (I), wherein $Cp^{R'}$ in the formula has at least two substituent groups and thus is bulky, can cause copolymerization to proceed in a stereoregular manner due to the steric hindrance. Further, in the method for manufacturing a copolymer of the present disclosure, it is possible to control a crystal content and a vinyl bond content (or a glass transition temperature) of the copolymer thus manufactured, by changing the core metal M and/or the ligand $Cp^{R'}$ in the half metallocene cation complex represented by general formula (I).

Therefore, according to the method for manufacturing a copolymer of the present disclosure, it is possible to control a crystal content and a vinyl bond content (or a glass transition temperature) of the copolymer thus manufactured, whereby a copolymer having a crystal content (a degree of crystallinity) and a vinyl bond content (or a glass transition temperature) as desired can be obtained.

In the half metallocene cation complex represented by general formula (I), $Cp^{R'}$ in the formula is substituted cyclopentadienyl, substituted indenyl or substituted fluorenyl. $Cp^{R'}$ is preferably a substituted indenyl among these examples. A crystal content and a vinyl bond content (or a glass transition temperature) of the copolymer thus manufactured can be more easily controlled than otherwise when $Cp^{R'}$ is a substituted indenyl.

$Cp^{R'}$ having a cyclopentadienyl ring as the base skeleton (i.e., substituted cyclopentadienyl) may be represented as $C_5H_{5-y}R_y$ in general formula (I).

In this regard, "y" is generally an integer in the range of 1 to 5, representing the number of substituent group R on the cyclopentadienyl ring. In the present disclosure, "y" is ≥2, i.e., the substituted cyclopentadienyl has two or more substituent groups R, R. In a case where the substituted cyclopentadienyl has two or more substituent groups R, R, then $Cp^{R'}$ becomes bulkier and causes more significant steric hindrance than otherwise when isoprene approaches the core metal M, thereby further facilitating an increase in vinyl bond content and a rise in the glass transition temperature in the resulting copolymer. The substituent group Rs preferably each independently represent hydrocarbyl or metalloid group, wherein at least one of the substituent groups Rs preferably has Si therein. The substituent group R having Si therein can contribute to making $Cp^{R'}$ bulky with maintaining stability of the complex, so that the $Cp^{R'}$ causes more significant steric hindrance than other wise when isoprene approaches the core metal M and thus further facilitates an increase in vinyl bond content and a rise in the glass transition temperature in the resulting copolymer. The number of carbon atoms of the hydrocarbyl group is preferably in the range of 1 to 20, more preferably in the range of 1 to 10, and still more preferably in the range of 1 to 8. Specifically, preferable examples of the hydrocarbyl group include methyl, ethyl, tert-butyl, phenyl, benzyl groups and the like. Examples of metalloid of the metalloid group include, in addition to silyl Si, germyl Ge and stannyl Sn. The metalloid group preferably includes a hydrocarbyl group which is defined in the same manner as the aforementioned hydrocarbyl group. Specific examples of the metalloid group include a substituent group having Si therein such as trimethylsilyl, tert-butyldimethylsilyl, and the like. Among these examples, at least one substituent group R is preferably a bulky substituent group such as tert-butyldimethylsilyl, benzyl, or the like. In a case where the substituent group R is a bulky substituent group, $Cp^{R'}$ becomes bulkier and causes more significant steric hindrance than otherwise when isoprene approaches the core metal M, thereby further facilitating an increase in vinyl bond content and a rise in the glass transition temperature in the resulting copolymer. A crystal content in the copolymer thus manufactured tends to decrease when the substituent group R is bulky, presumably because then randomness in monomer conversion improves.

$Cp^{R'}$ having an indenyl ring as the base skeleton (i.e., substituted indenyl) may be represented as $C_9H_{7-y}R_y$ or $C_9H_{11-y}R_y$ in general formula (I).

In this regard, "y" is generally an integer in the range of 1 to 7 or 1 to 11, representing the number of substituent group R on the indenyl ring. In the present disclosure, "y" is ≥2, i.e., the substituted indenyl has two or more substituent groups. In a case where the substituted indenyl has two or more substituent groups R, R, then the $Cp^{R'}$ becomes bulkier and causes more significant steric hindrance than otherwise when isoprene approaches the core metal M, thereby further facilitating an increase in vinyl bond content and a rise in the glass transition temperature in the resulting copolymer. Further, it is preferable that at least one of the substituent groups R, R exists on the five-membered ring of the substituted indenyl. The substituted indenyl coordinates with the core metal M on the five-membered ring side thereof. Accordingly, in a case where the substituent group R exists on the five-membered ring of the substituted indenyl, $Cp^{R'}$ (substituted indenyl) causes more steric hindrance than otherwise when isoprene approaches the core metal M, thereby further facilitating an increase in vinyl bond content and a rise in the glass transition temperature in the resulting copolymer. The substituent group Rs preferably each independently represent hydrocarbyl or metalloid group, wherein at least one of the substituent groups Rs preferably has Si therein. The substituent group R having Si therein can contribute to making $Cp^{R'}$ bulky with maintaining stability of the complex, so that the $Cp^{R'}$ causes more significant steric hindrance than otherwise when isoprene approaches the core metal M and thus further facilitates an increase in vinyl bond content and a rise in the glass transition temperature in the resulting copolymer. The number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, phenyl, benzyl groups and the like. Examples of metalloid of the metalloid group include, in addition to silyl Si, germyl Ge and stannyl Sn. The metalloid group preferably includes a hydrocarbyl group which is defined in the same manner as the aforementioned hydrocarbyl group. Specific examples of the metalloid group include a substituent group having Si therein such as trimethylsilyl, tert-butyldimethylsilyl, and the like. Among these examples, at least one substituent group R is preferably a bulky substituent group such as tert-butyldimethylsilyl, benzyl, or the like. In a case where the substituent group R is a bulky substituent group, $Cp^{R'}$ becomes bulkier and causes more significant steric hindrance when isoprene to be polymerized approaches the core metal M than otherwise, thereby further facilitating an increase in vinyl bond content and a rise in the glass transition temperature in the resulting copolymer. A crystal content in the copolymer thus manufactured tends to decrease when the substituent group R is bulky, presumably because then randomness in monomer conversion improves.

Specific examples of the substituted indenyl include 1,3-bis(tert-butyldimethylsilyl)indenyl, 1-tert-butyldimethylsilyl-3-trimethylsilylindenyl, 1,3-bis(trimethylsilyl)indenyl, 1-tert-butyldimethylsilyl-3-benzylindenyl, 1-tert-butyldimethylsilyl-3-phenylindenyl, 2-tert-butyldimethylsilylindenyl, 2-trimethylsilyl indenyl, and the like.

$Cp^{R'}$ having a fluorenyl ring as the base skeleton (i.e., substituted fluorenyl) can be represented as $C_{13}H_{9-y}R_y$ or $C_{13}H_{17-y}R_y$ in general formula (I).

In this regard, "y" is generally an integer in the range of 1 to 9 or 1 to 17, representing the number of substituent group R on the fluorenyl ring. In the present disclosure, "y" is ≥2, i.e., the substituted fluorenyl has two or more substituent groups R, R. In a case where the substituted fluorenyl has two or more substituent groups R, R, then $Cp^{R'}$ becomes bulkier and causes more significant steric hindrance than otherwise when isoprene approaches the core metal M, thereby further facilitating an increase in vinyl bond content and a rise in the glass transition temperature in the resulting copolymer. The substituent ring Rs preferably each independently represent hydrocarbyl or metalloid group, wherein at least one of the substituent groups Rs preferably has Si therein. The substituent group R having Si therein can contribute to making $Cp^{R'}$ bulky with maintaining stability of the complex, so that the $Cp^{R'}$ causes more significant steric hindrance than otherwise when isoprene approaches the core metal M and thus further facilitates an increase in vinyl bond content and a rise in the glass transition temperature in the resulting copolymer. The number of carbon atoms of the hydrocarbyl group is preferably in the range of 1 to 20, more preferably in the range of 1 to 10, and still more preferably in the range of 1 to 8. Specifically, preferable examples of the hydrocarbyl group include methyl, ethyl, tert-butyl, phenyl, benzyl groups and the like. Examples of metalloid of the metalloid group include, in addition to silyl Si, germyl Ge and stannyl Sn. The metalloid group preferably includes a hydrocarbyl group which is defined in the same manner as the aforementioned hydrocarbyl group. Specific examples of the metalloid group include a substituent group having Si therein such as trimethylsilyl, tert-butyldimethylsilyl, and the like. Among these examples, at least one substituent group R is preferably a bulky substituent group such as tert-butyldimethylsilyl, benzyl, or the like. In a case where the substituent group R is a bulky substituent group, $Cp^{R'}$ becomes bulkier and causes more significant steric hindrance than otherwise when isoprene to be polymerized approaches the core metal M, thereby further facilitating an increase in vinyl bond content and a rise in the glass transition temperature in the resulting copolymer. A crystal content in the copolymer thus manufactured tends to decrease when the substituent group R is bulky, presumably because then randomness in monomer conversion improves.

The core metal M in general formula (I) is a lanthanoid element, scandium or yttrium. The lanthanoid elements include fifteen elements having atomic numbers 57-71 and any of these elements is acceptable. Preferable examples of the core metal M include samarium Sm, neodymium Nd, praseodymium Pr, gadolinium Gd, cerium Ce, holmium Ho, scandium Sc, and yttrium Y.

In this respect, a core metal M having a relatively small atomic radius is more likely to increase a vinyl bond content and raise the glass transition temperature of the resulting copolymer than otherwise. On the other hand, a core metal M having a relatively large atomic radius is more likely to increase a crystal content of the resulting copolymer than otherwise, presumably because randomness in monomer conversion deteriorates in this case. Accordingly, it is possible to decrease a crystal content, with increasing a vinyl bond content (and raising the glass transition temperature), of the resulting copolymer by using a core metal M having a relatively small atomic radius. Alternatively, it is possible to increase a crystal content, with decreasing a vinyl bond content (and lowering the glass transition temperature), of the resulting copolymer by using a core metal M having a relatively large atomic radius.

Among the examples of the core metal M described above, neodymium Nd, gadolinium Gd, holmium Ho, and yttrium Y are preferable and gadolinium Gd and yttrium Y are particularly preferable in terms of reactivity.

In general formula (I), X is selected from the group consisting of hydrogen atom, halogen atom, alkoxy group, thiolate group, amide group, silyl group, and a $C_{1-20}$ monovalent hydrocarbon group. Acceptable examples of the halogen atom represented by X in general formula (I) include fluorine, chlorine, bromine and iodine atoms. Chlorine or bromine atom is preferable, although any of the aforementioned four halogen atoms may be employed.

In general formula (I), examples of the alkoxy group represented by X include: aliphatic alkoxy group such as methoxy, ethoxy, propoxy, n-butoxy, isobutoxy, sec-butoxy, tert-butoxy, and the like; and aryloxy group such as phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy, 2-isopropyl-6-neopentylphenoxy, and the like. 2,6-di-tert-butylphenoxy is preferable as the alkoxy group among these examples.

Examples of the thiolate group represented by X in general formula (I) include: aliphatic thiolate group such as thiomethoxy, thioethoxy, thiopropoxy, n-thiobutoxy, thoisobutoxy, sec-thiobutoxy, tert-thiobutoxy, and the like; and arylthiolate group such as thiophenoxy, 2,6-di-tert-butylthiophenoxy, 2,6-diisopropylthiophenoxy, 2,6-dineopentylthiophenoxy, 2-tert-butyl-6-isopropylthiophenoxy, 2-tert-butyl-6-thioneopentylphenoxy, 2-isopropyl-6-thioneopentylphenoxy, 2,4,6-triisopropylthiophenoxy, and the like. 2,4,6-triisopropylthiophenoxy is preferable as the thiolate group among these examples.

Examples of the amide group represented by X in general formula (I) include: aliphatic amide group such as dimethylamide, diethylamide, diisopropylamide, and the like; arylamide group such as phenylamide, 2,6-di-tert-butylphenylamide, 2,6-diisopropylphenylamide, 2,6-dineopentylphenylamide, 2-tert-butyl-6-isopropylphenylamide, 2-tert-butyl-6-neopentylphenylamide, 2-isopropyl-6-neopentylphenylamide, 2,4,6-tri-tert-butylphenylamide, and the like; bis(trialkylsilyl)amide such as bis(trimethylsilyl)amide and the like; and bis(dialkylsilyl)amide such as bis(dimethylsilyl)amide and the like. Bis(trimethylsilyl)amide group and bis(dimethylsilyl)amide group are preferable as the amide group among these examples.

Examples of the silyl group represented by X in general formula (I) include trimethylsilyl, tris(trimethylsilyl)silyl, bis(trimethylsilyl)methylsilyl, trimethylsilyl(dimethyl)silyl, triisopropylsilyl(bistrimethylsilyl)silyl, and the like. Tris(trimethylsilyl)silyl is preferable as the silyl group among these examples.

Specific examples of the $C_{1-20}$ monovalent hydrocarbon group represented by X in general formula (I) include: normal/branched aliphatic hydrocarbon group such as methyl, ethyl, n-propyl, isopropyl, n-butyl, isobutyl, sec-butyl, tert-butyl, neopentyl, hexyl, octyl; aromatic hydrocarbon group such as phenyl, tolyl, naphthyl; aralkyl group such as benzyl; a hydrocarbon group containing silicon atom such as trimethylsilylmethyl, bis(trimethylsilyl)methyl; and the like. Methyl, ethyl, isobutyl, trimethylsilylmethyl, and the like are preferable as the $C_{1-20}$ monovalent hydrocarbon group among these examples.

Bis(trimethylsilyl)amide or bis(dimethylsilyl)amide or a $C_{1-20}$ monovalent hydrocarbon group is preferable as X in general formula (I).

Examples of the non-coordinating anion represented by [B]⁻ in general formula (I) include quadrivalent boron anion. Specific examples of the quadrivalent boron anion include tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra (tolyl)borate, tetra(xylyl)borate, triphenyl(pentafluorophenyl)borate, [tris(pentafluorophenyl)phenyl]borate, tridecahydride-7,8-dicarbaundecaborate, and the like. Tetrakis(pentafluorophenyl)borate is preferable as the quadrivalent boron anion among these examples.

The half metallocene cation complex represented by general formula (I) further includes 0 to 3, preferably 0 to 1, neutral Lewis base L. Examples of the neutral Lewis base L include tetrahydrofuran, diethyl ether, dimethylaniline, trimethylphosphine, lithium chloride, neutral olefin, neutral diolefin, and the like. The neutral Lewis bases L may be of either the same type or different types when the complex includes a plurality of neutral Lewis bases L.

Further, the half metallocene cation complex represented by general formula (I) may exist as any of monomer, dimer or another type of multimer.

The half metallocene cation complex represented by general formula (I) can be obtained, for example, by a reaction shown below.

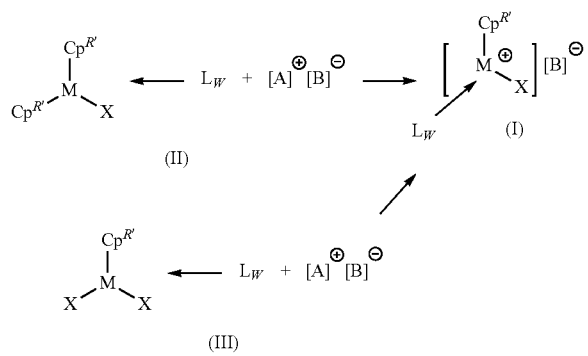

In the compound represented by general formula (II) or general formula (III), M represents a lanthanoid element, scandium or yttrium; $Cp^{R'}$ or $Cp^{R'}$s each independently represent substituted cyclopentadienyl, substituted indenyl or substituted fluorenyl; and X or Xs each independently represent hydrogen atom, halogen atom, alkoxy, thiolate, amide, silyl, or a $C_{1-20}$ monovalent hydrocarbon group. L represents a neutral Lewis base and w represents an integer in the range of 0 to 3. $[A]^+$ represents a cation and $[B]^-$ represents a non-coordinating anion in an ionic compound represented by general formula $[A]^+[B]^-$.

Examples of the cation represented by $[A]^+$ include carbonium cation, oxonium cation, amine cation, phosphonium cation, cycloheptatrienyl cation, ferrocenium cation having transition metal, and the like. Examples of the carbonium cation include trisubstituted carbonium cation such as triphenylcarbo(e)nium cation (which may occasionally be referred to as "trityl cation"), tri(substituted phenyl)carbonium cation, and the like. Specific examples of the tri(substituted phenyl)carbonium cation include tri(methylphenyl)carbonium cation. Examples of the amine cation include: trialkylammonium cation such as trimethylammonium cation, triethylammonium cation, tripropylammonium cation, tributylammonium cation; N,N-dialkylanilinium cation such as N,N-dimethylanilinium cation, N,N-diethylanilinium cation, N,N-2,4,6-pentamethylanilinium cation; dialkylammonium cation such as diisopropylammonium cation, dicyclohexylammonium cation; and the like. Examples of the phosphonium cation include triarylphosphonium cation such as triphenylphosphonium cation, tri(methylphenyl)phosphonium cation, tri(dimethylphenyl)phosphonium cation, and the like. N,N-dialkylanilinium cation or carbonium cation is preferable and N,N-dialkylanilinium cation is particularly preferable as $[A]^+$ among these examples.

The ionic compound represented by general formula $[A]^+[B]^-$ for use in the aforementioned reaction is, for example, a compound obtained by combining a non-coordinating anion and a cation respectively selected from the aforementioned examples and preferably N,N-dimethylanilinium tetrakis(pentafluorophenyl)borate, triphenylcarbonium tetrakis(pentafluorophenyl)borate (which may occasionally be referred to as "trityl tetrakis(pentafluorophenyl)borate"), and the like. The ionic compound represented by general formula $[A]^+[B]^-$ is added to the compounds represented by general formula (II) or general formula (III) by an amount preferably 0.1 to 10 times, more preferably approximately 1 times, as much as the amount of the compounds represented by general formula (II) or general formula (III) when compared in mol. In the case where the half metallocene cation complex represented by general formula (I) is used for a polymerization reaction, the half metallocene cation complex represented by general formula (I) may be directly provided into a polymerization reaction system or, alternatively, the half metallocene cation complex represented by general formula (I) may be formed in a polymerization reaction system by providing a compound represented by general formula (II) or general formula (III) and the ionic compound represented by general formula $[A]^+[B]^-$ for use in the aforementioned reaction, respectively, in the polymerization reaction system.

The structure of the half metallocene cation complex represented by general formula (I) can be determined through x-ray structural analysis.

A concentration of the half metallocene cation complex contained in the polymerization catalyst composition is preferably in the range of 0.0001 mol/L to 0.1 mol/L in the polymerization reaction system.

The polymerization catalyst composition may further include other components included in a conventional metallocene complex-containing polymerization catalyst composition, e.g., a prompter. In the present disclosure, a "metallocene complex" represents a complex compound in which at least one cyclopentadienyl or derivative thereof is bonded to a core metal. In the present disclosure, a metallocene complex in which only a single cyclopentadienyl or derivative thereof (indenyl, fluorenyl, or the like) is bonded to a core metal is referred to as a "half metallocene complex" in particular.

The prompter applicable to the polymerization catalyst composition described above can be selected according to necessity from components used as prompters for a conventional polymerization catalyst composition containing a metallocene complex. Preferable examples of the prompter include aluminoxane, an organic aluminum compound, the ionic compounds described above, and the like. Either a single type or combination of two or more types of these examples may be used as the prompter.

The aforementioned aluminoxane is preferably alkylaluminoxane and examples thereof include methylaluminoxane (MAO), modified methylaluminoxane, and the like. "MMAO-3A" (manufactured by Tosoh Finechem Corporation) or the like is preferable as the modified methylaluminoxane. Provided that "Al/M" represents an element ratio of the aluminum element Al of the aluminoxane with respect to the core metal M of the half metallocene cation complex, a content of the aluminoxane in the polymerization catalyst composition is preferably set such that the element ratio Al/M is in the range of 10 to 1000 approximately, desirably around 100.

On the other hand, the aforementioned organic aluminum compound is preferably an organic aluminum compound represented by general formula $AlR^1R^2R^3$ (in the formula, $R^1$ and $R^2$ each independently represent a $C_{1-10}$ hydrocarbon group or a hydrogen atom and $R^3$ represents a $C_{1-10}$ hydrocarbon group). Examples of the organic aluminum compound include trialkylaluminum, dialkylaluminum hydride, and the like. Trialkylaluminum is preferable as the organic aluminum compound among these examples. Examples of trialkylaluminum include triethylaluminum, triisobutylaluminum, and the like. Examples of dialkylaluminum hydride include diisobutylaluminum hydride, and the like. A content of the organic aluminum compound in the polymerization catalyst composition is preferably 1 to 50 times, more preferably around 10 times, as much as the content of the half metallocene cation complex in the composition when compared in mol.

A vinyl bond content and/or the molecular weight of a resulting copolymer can be controlled by using the half metallocene cation complex represented by general formula (I) with an appropriate prompter in combination in the polymerization catalyst composition.

It is preferable that the polymerization catalyst composition contains no halogen compound in the method for manufacturing a copolymer of the present disclosure. Conventionally, a halogen compound such as dialkylaluminum chloride, alkylaluminum dichloride or the like is often used when an organic aluminum compound is employed as a prompter in a polymerization reaction using a half metallocene cation complex or a metallocene complex. However, in the present disclosure, it is possible to obtain a copolymer having a higher vinyl bond content than otherwise by not using a halogen compound in combination with the half metallocene cation complex represented by general formula (I).

The method for manufacturing a copolymer of the present disclosure includes a process of copolymerizing ethylene with isoprene under the presence of the polymerization catalyst composition described above (which polymerizing process will simply be referred to as the "copolymerization process" hereinafter). The method for manufacturing a copolymer of the present disclosure may further include other processes such as coupling process and rinsing process, according to necessity. Further, another monomer, in addition to ethylene and isoprene, may also be copolymerized in the copolymerization process.

Any polymerization method such as solution polymerization, suspension polymerization, liquid-phase bulk polymerization, emulsion polymerization, vapor-phase polymerization, or solid-phase polymerization can be used as the polymerization method in the copolymerization process. In a case where a solvent is used in the polymerization reaction, any solvent is acceptable as long as the solvent is inactive in the polymerization reaction. Examples of the solvent include toluene, hexane (e.g. cyclohexane, n-hexane), and the like. Hexane is preferable among the examples. Environmental burden can be reduced by using hexane as a solvent in the polymerization.

It is possible, under the presence of the polymerization catalyst composition described above, to control respective contents of ethylene unit and isoprene unit and respective bond contents (cis-1,4 bond content, trans-1,4 bond content, 3,4 vinyl bond content, and 1,2 vinyl bond content) in the resulting copolymer by controllably changing the reaction conditions such as reaction temperature, reaction time, amounts and/or a ratio of ethylene and isoprene to be charged, and the like. A content of ethylene unit in the resulting copolymer is not particularly restricted but preferably in the range of 5 mass % to 95 mass %, for example.

A content of isoprene unit in the resulting copolymer is not particularly restricted but preferably in the range of 5 mass % to 95 mass %, for example.

The polymerization reaction is preferably carried out in an atmosphere of inert gas, desirably in an atmosphere of nitrogen gas or argon gas in the copolymerization process. The polymerization temperature in the polymerization reaction, although it is not particularly restricted, is preferably in the range of −100° C. to 200° C. and may be around the room temperature, for example. Pressure during the polymerization reaction is preferably in the range of 0.1 MPa to 10.0 MPa. Reaction time of the polymerization reaction is preferably in the range of 1 second to 10 days, for example, although it is not particularly restricted. The reaction time may be appropriately set depending on conditions such as a micro structure desired for the resulting copolymer, type of the catalyst, the polymerization temperature, and the like. The polymerization reaction can be stopped by using a polymerization terminator such as methanol, ethanol, isopropanol in the copolymerization process.

The coupling process is a process of carrying out a reaction (a coupling reaction) for modifying at least a portion, e.g., a terminal end, of a copolymer obtained by the copolymerization process described above.

In the coupling process, the coupling reaction is preferably carried out when a conversion ratio in the polymerization reaction has reached 100%.

Type of a coupling agent for use in the coupling reaction is not particularly restricted and can be appropriately selected according to the purpose. Examples of the coupling agent include: (i) a tin-containing compound such as bis(maleic acid-1-octadecyl)dioctyl tin (IV); (ii) an isocyanate compound such as 4,4'-diphenylmethane diisocyanate; (iii) an alkoxysilane compound such as glycidyl propyltrimethoxysilane; and the like. Either a single type or combination of two or more types of these examples may be used as the coupling agent. Bis(maleic acid-1-octadecyl)dioctyl tin (IV) is preferable as the coupling agent among these examples in terms of high reaction efficiency and relatively little gel generation.

It is possible to increase the number-average molecular weight (Mn) and the weight-average molecular weight (Mw) of the resulting copolymer by carrying out a coupling reaction.

The rinsing process is a process of rinsing a copolymer obtained by the aforementioned copolymerization process. Type of a medium for use in the rinsing process is not particularly restricted and can be appropriately selected according to the purpose. Examples of the medium include methanol, ethanol, isopropanol, and the like. An acid (such as hydrochloric acid, sulfuric acid, nitric acid) may be added to such a medium or solvent as described above in use. An amount to be added, of the acid, is preferably 15 mol % or less with respect to the solvent. Addition of the acid by an amount exceeding 15 mol % with respect to the solvent may cause the acid to remain in the copolymer, possibly adversely affecting mixture and kneading processes and a vulcanization reaction.

An amount of catalyst residue in the copolymer can be decreased to an appropriate level by the rinsing process.

<Copolymer>

A copolymer obtained by the method for manufacturing a copolymer of the present disclosure includes ethylene unit and isoprene unit therein and has a crystal content and a vinyl bond content (or a glass transition temperature) as desired. A copolymer obtained by the method is an ethylene-isoprene copolymer in one preferable embodiment of the present disclosure.

A vinyl bond content of a copolymer obtained by the method for manufacturing a copolymer of the present disclosure can be controllably set at a desired value by appropriately selecting the core metal M and/or the ligand $Cp^{R'}$ of the half metallocene cation complex represented by general formula (I). According to another preferable embodiment of the present disclosure, a copolymer having a vinyl bond content in the range of 20 mass % to 50 mass % is easily obtained.

The vinyl bond content of the copolymer described above represents the sum of a content of 1,2-bonding unit of isoprene (i.e., 1,2-vinyl bond content) and a content of 3,4-bonding unit of isoprene (i.e., a 3,4-vinyl bond content).

According to yet another preferable embodiment of the present disclosure, a copolymer having a 1,2-vinyl bond content of ≤1 mass % is easily obtained. In this regard, the 1,2-vinyl bond content of the copolymer may be ≤0.5 mass % or even 0 mass % (that is, ≤ the lower limit detectable by NMR).

In a copolymer obtained by the method for manufacturing a copolymer of the present disclosure, the glass transition temperature thereof tends to rise as a vinyl bond content thereof increases. On that basis, it is possible in the method of the present disclosure to controllably set the glass transition temperature of the resulting copolymer at a desired value by appropriately selecting the core metal M and/or the ligand $Cp^{R'}$ of the half metallocene cation complex represented by general formula (I). According to yet another preferable embodiment of the present disclosure, a copolymer having the glass transition temperature (Tg) in the range of −60° C. to 20° C. as measured by a differential scanning calorimeter (DSC) is easily obtained and a copolymer having the glass transition temperature (Tg) in the range of −29° C. to −15° C. as measured by a differential scanning calorimeter (DSC) is more easily obtained.

Regarding a copolymer obtained by the method for manufacturing a copolymer of the present disclosure, it is possible to controllably set a crystal content of the resulting copolymer at a desired value by appropriately selecting the core metal M and/or the ligand $Cp^{R'}$ of the half metallocene cation complex represented by general formula (I) in the method. The crystal content of the resulting copolymer correlates to a quantity of a portion where ethylene units are continuously present in the copolymer. On that basis, it is assumed that in the method for manufacturing a copolymer of the present disclosure a crystal content of a resulting copolymer can be controlled by appropriately selecting the core metal M and/or the ligand $Cp^{R'}$ of the half metallocene cation complex and thus changing randomness in monomer conversion.

According to yet another preferable embodiment of the present disclosure, a copolymer having a crystal content in the range of 10% to 50% is easily obtained and a copolymer having a crystal content in the range of 14% to 30% is more easily obtained. A crystal content of the copolymer, of ≥10%, sufficiently ensures crystallinity caused by ethylene units and improves fracture resistance of the copolymer. A crystal content of the copolymer, of ≤50%, improves workability in a process of mixing and kneading a rubber composition described below.

In a copolymer obtained by the method for manufacturing a copolymer of the present disclosure, the weight-average molecular weight (Mw) in terms of polystyrene is preferably in the range of 20,000 to 4,000,000 and more preferably in the range of 50,000 to 3,000,000. In a case where the copolymer is used for a rubber composition, mechanical strength of the rubber composition successfully improves when Mw is ≥20,000 and workability of the rubber composition successfully improves when Mw is ≤4,000,000.

In a copolymer obtained by the method for manufacturing a copolymer of the present disclosure, the number-average molecular weight (Mn) in terms of polystyrene is preferably in the range of 10,000 to 2,000,000 and more preferably in the range of 20,000 to 1,500,000. In a case where the copolymer is used for a rubber composition, mechanical strength of the rubber composition successfully improves when Mn is ≥10,000 and workability of the rubber composition successfully improves when Mn is ≤2,000,000.

In a copolymer obtained by the method for manufacturing a copolymer of the present disclosure, the molecular weight distribution (the weight-average molecular weight (Mw) in terms of polystyrene/the number-average molecular weight (Mn) in terms of polystyrene) thereof is preferably in the range of 1 to 4. The physical properties of the copolymer exhibit satisfactory uniformity when the molecular weight distribution of the copolymer is ≤4.

<Application of Copolymer>

A copolymer obtained by the method for manufacturing a copolymer of the present disclosure can be utilized as a rubber component of a rubber composition. The rubber composition, containing the copolymer as a rubber component, may further contain other rubber components, a filler, a crosslinking agent, and other components according to necessity.

A content of the copolymer in the rubber component described above is preferably in the range of 10 to 100 mass %, more preferably in the range of 20 to 100 mass %, and still more preferably in the range of 30 to 100 mass %. Types of rubber components other than the copolymer of the present disclosure are not particularly restricted and can be appropriately selected according to the purpose. Examples of other rubber components include natural rubber (NR), butadiene rubber (BR), isoprene rubber (IR), acrylonitrile-butadiene rubber (NBR), chloroprene rubber, ethylene-propylene rubber (EPM), ethylene-propylene-nonconjugated diene rubber (EPDM), polysulfide rubber, silicone rubber, fluororubber, urethane rubber, and the like. Either a single type or combination of two or more types of these examples may be used as the other rubber components.

The rubber composition can improve reinforcing properties thereof by including a filler therein. Type of the filler is not particularly restricted and examples thereof include carbon black, silica, aluminum hydroxide, clay, alumina, talc, mica, kaolin, glass balloons, glass beads, calcium carbonate, magnesium carbonate, magnesium hydroxide, magnesium oxide, titanium oxide, potassium titanate, barium sulfate, and the like. Carbon black and/or silica is preferably used as the filler among these examples. Either a single type or combination of two or more types of these examples may be used as the filler.

A content of the filler, although it is not particularly restricted and appropriately selected according to the purpose, is preferably 10 to 100 parts by mass, more preferably 20 to 80 parts by mass, and most preferably 30 to 60 parts by mass, with respect to 100 parts by mass of the rubber component. The content of the filler, of ≥10 parts by mass with respect to 100 parts by mass of the rubber component, ensures an effect of improving the reinforcing property of the rubber composition by the filler. The content of the filler, of ≤100 parts by mass with respect to 100 parts by mass of the rubber component, ensures good workability of the rubber composition.

Type of the crosslinking agent is not particularly restricted and can be appropriately selected according to the purpose. Examples of the crosslinking agent include sulfur-based crosslinking agent, organic peroxide-based crosslinking agent, inorganic crosslinking agent, polyamine crosslinking agent, resin crosslinking agent, sulfur compound-based crosslinking agent, oxime-nitrosamine-based crosslinking agent, and the like. Sulfur-based crosslinking agent (vulcanizing agent) among these examples is preferably applied to a rubber composition for a tire.

A content of the crosslinking agent is not particularly restricted and can be appropriately selected according to the purpose but is preferably in the range of 0.1 to 10 parts by mass with respect to 100 parts by mass of the rubber component.

When a vulcanizing agent is employed, a vulcanization accelerator may be used in combination with the vulcanizing agent. Examples of the vulcanization accelerator include guanidine based, aldehyde-amine based, aldehyde-ammonium based, thiazole based, sulfenamide based, thiourea based, thiuram based, dithiocarbamate based, xanthate based compounds, and the like.

Further, other known additives such as a softener, a vulcanization accelerator aid, a coloring agent, a fire retardant, a lubricant, a foaming agent, a plasticizer, a processing aid, an antioxidant, an antiaging agent, a scorch protection agent, a UV protection agent, an antistatic agent, an anti-coloring agent, and the like may optionally be used in the rubber composition according to the necessity.

The rubber composition is applicable to a tire, a rubber damper, quake-absorbing rubber, a belt such as a conveyor belt, a rubber crawler, hoses of various types, and the like.

EXAMPLES

The present disclosure will be described further in detail by Examples hereinafter. The present disclosure is not restricted by any means by these Examples.

Example 1

A copolymer of Example 1 was obtained by: charging 289 g of toluene and 460 g of a toluene solution containing 100 g of isoprene into a thoroughly dry 2000 mL pressure-resistant stainless reactor;
  charging, on the other hand, 0.010 mmol of mono(1,3-bis(tert-butyldimethylsilyl)indenyl) gadolinium bis(bis(dimethylsilyl)amide) complex $\{1,3\text{-}[(t\text{-Bu})Me_2Si]_2C_9H_5Gd[N(SiHMe_2)_2]_2\}$, 0.010 mmol of trityl tetrakis(pentafluorophenyl)borate $[Ph_3CB(C_6F_5)_4]$, 0.020 mmol of triisobutylaluminum, and 2.5 mmol of diisobutylaluminum hydride into a glass vessel in a glovebox under nitrogen atmosphere and dissolving the substances in 5 mL of toluene, to obtain a catalyst solution;
  adding the catalyst solution thus obtained, to the pressure-resistant stainless reactor, and heating the mixture in the reactor to 85° C.;
  then carrying out copolymerization, by adding ethylene to the pressure-resistant stainless reactor at pressure of the ethylene: 1.0 MPa, at 85° C. for 2 hours in total;
  then stopping the reaction by adding an isopropanol solution (1 mL) of 5 mass % 2,2'-methylene-bis(4-ethyl-6-tert-butylphenol) (NS-5) to the pressure-resistant stainless reactor; and
  isolating a copolymer by using a large amount of methanol and vacuum-drying the copolymer at 50° C., thereby obtaining 145 g of the copolymer of Example 1.

Example 2

A copolymer of Example 2 was obtained by: charging 470 g of toluene and 280 g of a toluene solution containing 61 g of isoprene into a thoroughly dry 2000 mL pressure-resistant stainless reactor;
  charging, on the other hand, 0.010 mmol of mono(1,3-bis(tert-butyldimethylsilyl)indenyl) gadolinium bis(bis(dimethylsilyl)amide) complex $\{1,3\text{-}[(t\text{-Bu})Me_2Si]_2C_9H_5Gd[N(SiHMe_2)_2]_2\}$, 0.010 mmol of trityl tetrakis(pentafluorophenyl)borate $[Ph_3CB(C_6F_5)_4]$, 0.020 mmol of triisobutylaluminum, and 2.5 mmol of diisobutylaluminum hydride into a glass vessel in a glovebox under nitrogen atmosphere and dissolving the substances in 5 mL of toluene, to obtain a catalyst solution;
  adding the catalyst solution thus obtained, to the pressure-resistant stainless reactor, and heating the mixture in the reactor to 85° C.;
  then carrying out copolymerization, by adding ethylene to the pressure-resistant stainless reactor at pressure of the ethylene: 1.0 MPa, at 85° C. for 1 hour in total;
  then stopping the reaction by adding an isopropanol solution (1 mL) of 5 mass 2,2'-methylene-bis(4-ethyl-6-tert-butylphenol) (NS-5) to the pressure-resistant stainless reactor; and
  isolating a copolymer by using a large amount of methanol and vacuum-drying the copolymer at 50° C., thereby obtaining 98 g of the copolymer of Example 2.

Example 3

A copolymer of Example 3 was obtained by: charging 290 g of toluene and 460 g of a toluene solution containing 100 g of isoprene into a thoroughly dry 2000 mL pressure-resistant stainless reactor;
  charging, on the other hand, 0.010 mmol of mono((1-tert-butyldimethylsilyl-3-benzyl)indenyl) gadolinium bis(bis(dimethylsilyl)amide) complex $\{1\text{-}[(t\text{-Bu})Me_2Si]\text{-}3\text{-}BnC_9H_5Gd[N(SiHMe_2)_2]_2\}$, 0.010 mmol of trityl tetrakis(pentafluorophenyl)borate $[Ph_3CB(C_6F_5)_4]$, 0.020 mmol of triisobutylaluminum, and 2.5 mmol of diisobutylaluminum hydride into a glass vessel in a glovebox under nitrogen atmosphere and dissolving the substances in 5 mL of toluene, to obtain a catalyst solution;
  adding the catalyst solution thus obtained, to the pressure-resistant stainless reactor, and heating the mixture in the reactor to 85° C.;
  then carrying out copolymerization, by adding ethylene to the pressure-resistant stainless reactor at pressure of the ethylene: 1.0 MPa, at 85° C. for 2 hours in total;
  then stopping the reaction by adding an isopropanol solution (1 mL) of 5 mass 2,2'-methylene-bis(4-ethyl-6-tert-butylphenol) (NS-5) to the pressure-resistant stainless reactor; and
  isolating a copolymer by using a large amount of methanol and vacuum-drying the copolymer at 50° C., thereby obtaining 95 g of the copolymer of Example 3.

Example 4

A copolymer of Example 4 was obtained by: charging 290 g of toluene and 460 g of a toluene solution containing 100 g of isoprene into a thoroughly dry 2000 mL pressure-resistant stainless reactor;
- charging, on the other hand, 0.010 mmol of mono((1-tert-butyldimethylsilyl-3-benzyl)indenyl) gadolinium bis(bis(dimethylsilyl)amide) complex {1-[(t-Bu)Me$_2$Si]-3-BnC$_9$H$_5$Gd[N(SiHMe$_2$)$_2$]$_2$}, 0.010 mmol of trityl tetrakis(pentafluorophenyl)borate [Ph$_3$CB(C$_6$F$_5$)$_4$], 0.020 mmol of triisobutylaluminum, and 2.5 mmol of diisobutylaluminum hydride into a glass vessel in a glovebox under nitrogen atmosphere and dissolving the substances in 5 mL of toluene, to obtain a catalyst solution;
- adding the catalyst solution thus obtained, to the pressure-resistant stainless reactor, and heating the mixture in the reactor to 85° C.;
- then carrying out copolymerization, by adding ethylene to the pressure-resistant stainless reactor at pressure of the ethylene: 1.0 MPa, at 85° C. for 2 hours and 5 minutes in total;
- then stopping the reaction by adding an isopropanol solution (1 mL) of 5 mass 2,2'-methylene-bis(4-ethyl-6-tert-butylphenol) (NS-5) to the pressure-resistant stainless reactor; and
- isolating a copolymer by using a large amount of methanol and vacuum-drying the copolymer at 50° C., thereby obtaining 100 g of the copolymer of Example 4.

Example 5

A copolymer of Example 5 was obtained by: charging 370 g of toluene and 380 g of a toluene solution containing 82 g of isoprene into a thoroughly dry 2000 mL pressure-resistant stainless reactor;
- charging, on the other hand, 0.010 mmol of mono((1-tert-butyldimethylsilyl-3-benzyl)indenyl) gadolinium bis(bis(dimethylsilyl)amide) complex {1-[(t-Bu)Me$_2$Si]-3-BnC$_9$H$_5$Gd[N(SiHMe$_2$)$_2$]$_2$}, 0.010 mmol of trityl tetrakis(pentafluorophenyl)borate [Ph$_3$CB(C$_6$F$_5$)$_4$], 0.020 mmol of triisobutylaluminum, and 2.5 mmol of diisobutylaluminum hydride into a glass vessel in a glovebox under nitrogen atmosphere and dissolving the substances in 5 mL of toluene, to obtain a catalyst solution;
- adding the catalyst solution thus obtained, to the pressure-resistant stainless reactor, and heating the mixture in the reactor to 85° C.;
- then carrying out copolymerization at 85° C. for 1 hour and 16 minutes in total, by adding ethylene to the pressure-resistant stainless reactor at pressure of the ethylene: 1.0 MPa and stopping the supply of ethylene 30 minutes after the start of ethylene charging, so that the pressure of ethylene in the reactor changed from 1.0 MPa to 0.5 MPa;
- then stopping the reaction by adding an isopropanol solution (1 mL) of 5 mass 2,2'-methylene-bis(4-ethyl-6-tert-butylphenol) (NS-5) to the pressure-resistant stainless reactor; and
- isolating a copolymer by using a large amount of methanol and vacuum-drying the copolymer at 50° C., thereby obtaining 52 g of the copolymer of Example 5.

Example 6

A copolymer of Example 6 was obtained by: charging 370 g of toluene and 380 g of a toluene solution containing 82 g of isoprene into a thoroughly dry 2000 mL pressure-resistant stainless reactor;
- charging, on the other hand, 0.010 mmol of mono((1-tert-butyldimethylsilyl-3-benzyl)indenyl) gadolinium bis(bis(dimethylsilyl)amide) complex {1-[(t-Bu)Me$_2$Si]-3-BnC$_9$H$_5$Gd[N(SiHMe$_2$)$_2$]$_2$}, 0.010 mmol of trityl tetrakis(pentafluorophenyl)borate [Ph$_3$CB(C$_6$F$_5$)$_4$], 0.020 mmol of triisobutylaluminum, and 2.5 mmol of diisobutylaluminum hydride into a glass vessel in a glovebox under nitrogen atmosphere and dissolving the substances in 5 mL of toluene, to obtain a catalyst solution;
- adding the catalyst solution thus obtained, to the pressure-resistant stainless reactor, and heating the mixture in the reactor to 85° C.;
- then carrying out copolymerization at 85° C. for 2 hours and 5 minutes in total, by adding ethylene to the pressure-resistant stainless reactor at pressure of the ethylene: 1.0 MPa and stopping the supply of ethylene 30 minutes after the start of ethylene charging, so that the pressure of ethylene in the reactor changed from 1.0 MPa to 0.5 MPa;
- then stopping the reaction by adding an isopropanol solution (1 mL) of 5 mass 2,2'-methylene-bis(4-ethyl-6-tert-butylphenol) (NS-5) to the pressure-resistant stainless reactor; and
- isolating a copolymer by using a large amount of methanol and vacuum-drying the copolymer at 50° C., thereby obtaining 80 g of the copolymer of Example 6.

Example 7

A copolymer of Example 7 was obtained by: charging 370 g of toluene and 380 g of a toluene solution containing 82 g of isoprene into a thoroughly dry 2000 mL pressure-resistant stainless reactor;
- charging, on the other hand, 0.010 mmol of mono((1-tert-butyldimethylsilyl-3-benzyl)indenyl) yttrium bis(bis(dimethylsilyl)amide) complex {1-[(t-Bu)Me$_2$Si]-3-BnC$_9$H$_5$Y[N(SiHMe$_2$)$_2$]$_2$}, 0.010 mmol of trityl tetrakis(pentafluorophenyl)borate [Ph$_3$CB(C$_6$F$_5$)$_4$], 0.020 mmol of triisobutylaluminum, and 2.5 mmol of diisobutylaluminum hydride into a glass vessel in a glovebox under nitrogen atmosphere and dissolving the substances in 5 mL of toluene, to obtain a catalyst solution;
- adding the catalyst solution thus obtained, to the pressure-resistant stainless reactor, and heating the mixture in the reactor to 85° C.;
- then carrying out copolymerization at 85° C. for 1 hour and 30 minutes in total, by adding ethylene to the pressure-resistant stainless reactor at pressure of the ethylene: 1.0 MPa and stopping the supply of ethylene 45 minutes after the start of ethylene charging, so that the pressure of ethylene in the reactor changed from 1.0 MPa to 0.5 MPa;
- then stopping the reaction by adding an isopropanol solution (1 mL) of 5 mass 2,2'-methylene-bis(4-ethyl-6-tert-butylphenol) (NS-5) to the pressure-resistant stainless reactor; and isolating a copolymer by using a large amount of methanol and vacuum-drying the copolymer at 50° C., thereby obtaining 111 g of the copolymer of Example 5.

Example 8

A copolymer of Example 8 was obtained by: charging 350 g of toluene and 380 g of a toluene solution containing 82 g of isoprene into a thoroughly dry 2000 mL pressure-resistant stainless reactor;

charging, on the other hand, 0.010 mmol of mono((1-tert-butyldimethylsilyl-3-benzyl)indenyl) yttrium bis(bis (dimethylsilyl)amide) complex {1-[(t-Bu)Me$_2$Si]-3-BnC$_9$H$_5$Y[N(SiHMe$_2$)$_2$]$_2$}, 0.010 mmol of trityl tetrakis(pentafluorophenyl)borate [Ph$_3$CB(C$_6$F$_5$)$_4$], 0.020 mmol of triisobutylaluminum, and 2.5 mmol of diisobutylaluminum hydride into a glass vessel in a glovebox under nitrogen atmosphere and dissolving the substances in 5 mL of toluene, to obtain a catalyst solution;

adding the catalyst solution thus obtained, to the pressure-resistant stainless reactor, and heating the mixture in the reactor to 85° C.;

then carrying out copolymerization at 85° C. for 1 hour and 30 minutes in total, by adding ethylene to the pressure-resistant stainless reactor at pressure of the ethylene: 1.0 MPa and stopping the supply of ethylene 45 minutes after the start of ethylene charging, so that the pressure of ethylene in the reactor changed from 1.0 MPa to 0.5 MPa;

then stopping the reaction by adding an isopropanol solution (1 mL) of 5 mass 2,2'-methylene-bis(4-ethyl-6-tert-butylphenol) (NS-5) to the pressure-resistant stainless reactor; and isolating a copolymer by using a large amount of methanol and vacuum-drying the copolymer at 50° C., thereby obtaining 68 g of the copolymer of Example 8.

<Analysis of Copolymers>

The catalytic activity, the weight-average molecular weight (Mw), the number-average molecular weight (Mn), the molecular weight distribution (Mw/Mn), respective contents of ethylene unit and isoprene unit, the vinyl bond content (1,2-vinyl bond content, 3,4-vinyl bond content), the glass transition temperature (Tg), the melting point (Tm), and the crystal content were measured for each of the copolymers thus obtained, by the methods described below. The results are shown in Table 1.

(1) Catalytic Activity

The catalytic activity was calculated according to a formula shown below.

[Yield (kg) of copolymer]/[Use amount (mol) of half metallocene cation complex]/[Reaction time (hours)]

(2) Weight-Average Molecular Weight (Mw), Number-Average Molecular Weight (Mn) and Molecular Weight Distribution (Mw/Mn)

The weight-average molecular weight (Mw), the number-average molecular weight (Mn) and the molecular weight distribution (Mw/Mn) in terms of polystyrene were determined for each of the copolymers thus obtained, relative to monodisperse polystyrene as a standard reference material, by using gel permeation chromatography [GPC: HLC-8320GPC manufactured by Tosoh Corporation, Column: GMH$_{HL}$×2 manufactured by Tosoh Corporation, Detector: a differential refractive index detector (RI)]. The measurement temperature was 40° C., the measurement flow rate was 1 mL/minute, the mobile phase was tetrahydrofuran (THF), the concentration of the analyte solution was 1 mg/mL, and the injected amount was 100 μL.

(3) Respective contents of ethylene unit and isoprene unit

Respective contents of ethylene unit and isoprene unit in each of the copolymers were determined from integration ratios of respective peaks in $^1$H-NMR spectrum (100° C., d-tetrachloroethane reference: 6 ppm).

(4) Vinyl bond content (1,2-vinyl bond content, 3,4-vinyl bond content) An NMR spectrum was obtained for each of the copolymers thus prepared, by using an NMR ("AVANCE 600" manufactured by Bruker Analytik Gmbh). A 1,2-vinyl bond content and a 3,4-vinyl bond content were calculated, respectively, from the integration ratios of the peaks including: ($^1$H-NMR: δ 4.6-4.8 (=CH$_2$ of 3,4-vinyl unit), 5.0-5.2 (—CH= of 1,4-unit), 5.6-5.8 (—CH= of 1,2-unit), 4.8-4.9 (=CH$_2$ of 1,2-unit); and $^{13}$C-NMR: δ 23.4 (1,4-cis unit), 15.9 (1,4-trans unit), 18.6 (3,4-unit)) obtained by the measurement of $^1$H-NMR and $^{13}$C-NMR. The vinyl bond content of the copolymer was calculated as the sum of the 1,2-vinyl bond content and the 3,4-vinyl bond content.

(5) Glass Transition Temperature (Tg)

The glass transition temperature (Tg) was measured for each of the copolymers thus obtained, according to JIS K 7121-1987, by using a differential scanning calorimeter (DSC) "DSCQ2000" manufactured by TA Instruments Japan.

(6) Melting Point (Tm)

Melting point (Tm) of each of the copolymers was measured according to JIS K 7121-1987 by using a differential scanning calorimeter (DSC) "DSCQ2000" manufactured by TA Instruments Japan.

(7) Crystal Content (Degree of Crystallinity)

Each of the copolymers was heated from −150° C. to 150° C. at a temperature-increasing rate of 10° C./minute and endothermic peak energy (endothermic energy at the endothermic peak) (ΔH) of the copolymer was measured, by using a differential scanning calorimeter (DSC) "DSCQ2000" manufactured by TA Instruments Japan. Further, crystal melting energy (ΔH$_0$) of polyethylene having a crystal component ratio: 100% was measured in a manner similar to the measurement of ΔH. A crystal content or a degree of crystallinity (%) of the copolymer was calculated from an energy ratio (ΔH/ΔH$_0$) of the endothermic peak energy (ΔH) of the copolymer with respect to the crystal melting energy (ΔH$_0$) of the polyethylene.

TABLE 1

|  |  | Example 1 | Example 2 | Example 3 | Example 4 | Example 5 | Example 6 | Example 7 | Example 8 |
|---|---|---|---|---|---|---|---|---|---|
| Catalytic activity | kg/mol/h | 7,250 | 9,800 | 4,750 | 4,800 | 4,105 | 4,000 | 11,060 | 6,800 |
| Number-average molecular weight (Mn) | ×10$^3$ | 41 | 24 | 117 | 96 | 56 | 75 | 72 | 65 |
| Weight-average molecular weight (Mw) | ×10$^3$ | 107 | 67 | 469 | 449 | 231 | 315 | 354 | 240 |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Molecular weight distribution (Mw/Mn) | — | | 2.6 | 2.82 | 4.01 | 4.7 | 4.12 | 4.2 | 4.9 | 3.7 |
| Content of ethylene unit | mass % | 38.3 | 52.4 | 35.8 | 33.2 | 51.7 | 49.8 | 36.7 | 37.4 |
| Content of isoprene unit | mass % | 61.7 | 47.6 | 64.2 | 66.8 | 48.3 | 50.2 | 63.3 | 62.6 |
| Vinyl bond content | mass % | 31.2 | 23 | 40.2 | 42.2 | 29.6 | 31.04 | 41.5 | 41.6 |
| 3,4-vinyl bond content | mass % | 31.2 | 23 | 40.2 | 42.2 | 29.6 | 31.04 | 41.5 | 41.6 |
| 1,2-vinyl bond content | mass % | 0 | 0 | 0 | 0 | 0 | 0 | 0 | 0 |
| Glass transition temperature (Tg) | ° C. | −27 | −29 | −20 | −20 | −21 | −20 | −14 | −15 |
| Melting point (Tm) | ° C. | 100 | 116 | 99 | 100 | 107 | 103 | 109 | 99 |
| Crystal content (Degree of crystallinity) | % | 19.2 | 30.2 | 15.2 | 14.3 | 23.9 | 18.1 | 20.8 | 19.8 |

It is understood from Table 1 that it is possible to control a crystal content (a degree of crystallinity) and a vinyl bond content (or a glass transition temperature) of the copolymer thus manufactured, by changing the core metal M and/or the ligand $Cp^{R'}$ in the half metallocene cation complex represented by general formula (I) and further controllably changing the reaction conditions such as reaction time, an amount of isoprene, pressure of ethylene, and the like.

For example, it is understood, by comparing Example 1 with Example 3 (their ethylene unit contents are regarded as approximately the same), that a crystal content of a resulting copolymer tends to decrease by introduction of benzyl group as a substituent group of the ligand $Cp^{R'}$ into the half metallocene cation complex. It is assumed that a crystal content decreases because randomness in monomer conversion improves in this case.

Further, it is understood, by comparing Examples 3 and 4 with Examples 7 and 8 (their ethylene unit contents are regarded as approximately the same), that a crystal content of a resulting copolymer tends to increase when a core metal M having relatively large atomic radius is employed in the half metallocene cation complex. It is assumed that a crystal content increases because randomness in monomer conversion deteriorates in this case.

INDUSTRIAL APPLICABILITY

The method for manufacturing a copolymer of the present disclosure is applicable to production of a copolymer which can be used as a rubber component of a rubber composition.

The invention claimed is:

1. A method for manufacturing a copolymer, wherein the method comprises:
a process of copolymerizing ethylene with isoprene under the presence of a polymerization catalyst composition containing a half metallocene cation complex represented by following general formula (I)

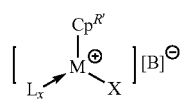

(In formula (I), M represents a lanthanoid element, scandium or yttrium; $Cp^{R'}$ represents substituted cyclopentadienyl, substituted indenyl or substituted fluorenyl; X represents hydrogen atom, halogen atom, alkoxy, thiolate, amide, silyl, or a $C_{1-20}$ monovalent hydrocarbon group; L represents a neutral Lewis base; w represents an integer in the range of 0 to 3; [B]⁻ represents a non-coordinating anion), and
$Cp^{R'}$ in general formula (I) has at least two substituent groups; and
a process of controllably setting a crystal content, a vinyl bond content or the glass transition temperature, of a copolymer to be manufactured, at desired values by selecting type of at least one of the core metal M and the ligand $Cp^{R'}$,
wherein the vinyl bond content is the sum of a content of 1,2-bonding unit and a content of 3,4-bonding unit of isoprene, and
the copolymer thus manufactured has the vinyl bond content in the range of 20 mass % to 50 mass % and the crystal content in the range of 10% to 50%.

2. The method for manufacturing a copolymer of claim 1, wherein each of the at least two substituent groups of $Cp^{R'}$ independently represents tert-butyl, phenyl, benzyl, or metalloid group.

3. The method for manufacturing a copolymer of claim 1, wherein $Cp^{R'}$ in general formula (I) is a substituted indenyl and at least one substituent group of the substituted indenyl contains Si.

4. The method for manufacturing a copolymer of claim 3, wherein at least one substituent group of the substituted indenyl exists on the five-membered ring of the substituted indenyl.

5. The method for manufacturing a copolymer of claim 1, wherein the polymerization catalyst composition contains no halogen compound.

6. The method for manufacturing a copolymer of claim 2, wherein the polymerization catalyst composition contains no halogen compound.

7. The method for manufacturing a copolymer of claim 3, wherein the polymerization catalyst composition contains no halogen compound.

8. The method for manufacturing a copolymer of claim 4, wherein the polymerization catalyst composition contains no halogen compound.

9. The method for manufacturing a copolymer of claim 1, wherein the copolymer thus manufactured has the crystal content in the range of 14% to 30%.

* * * * *